Nov. 30, 1965  C. R. GOLLNICK  3,220,586
REFUSE COLLECTING AND TRANSPORTING VEHICLE
Filed Aug. 26, 1963  8 Sheets-Sheet 1
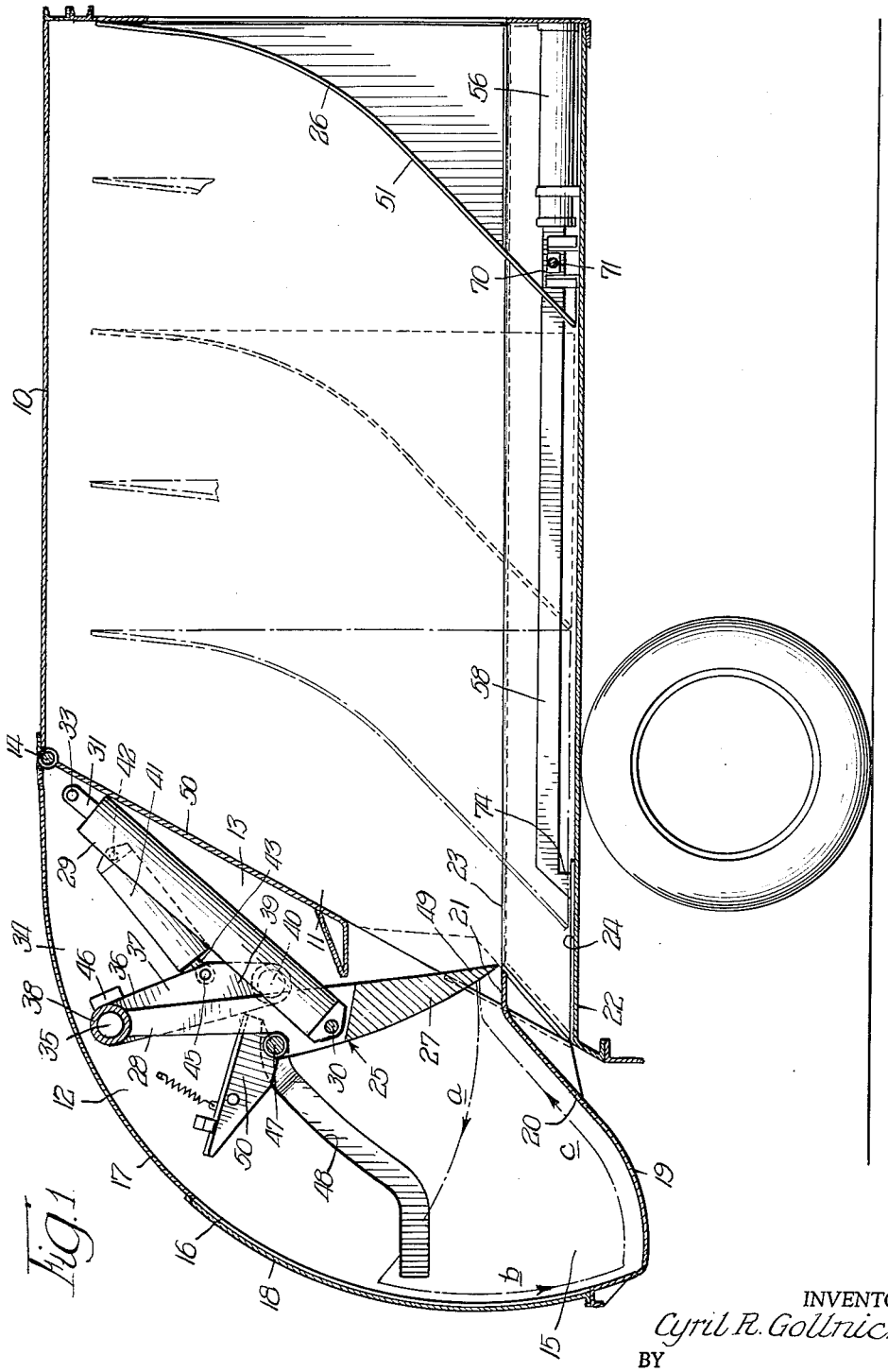
INVENTOR.
Cyril R. Gollnick,
BY Nov. 30, 1965 C. R. GOLLNICK 3,220,586
REFUSE COLLECTING AND TRANSPORTING VEHICLE
Filed Aug. 26, 1963 8 Sheets-Sheet 2
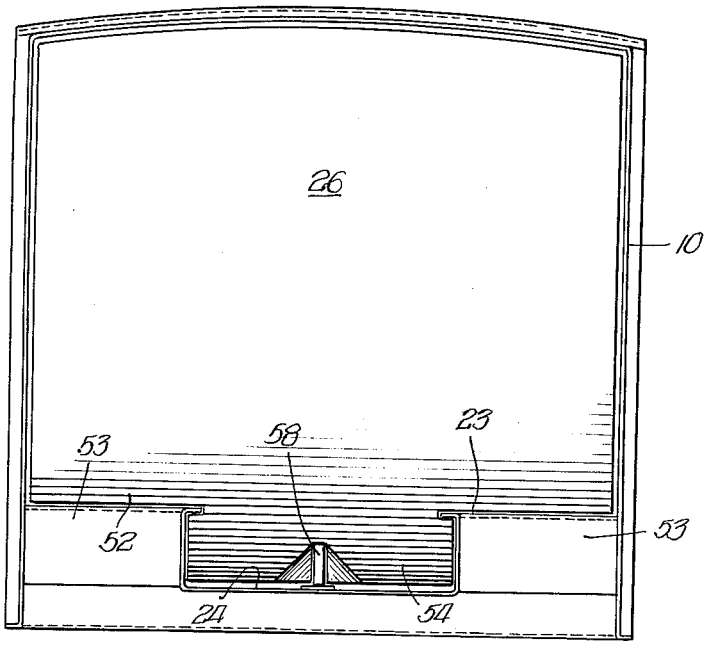
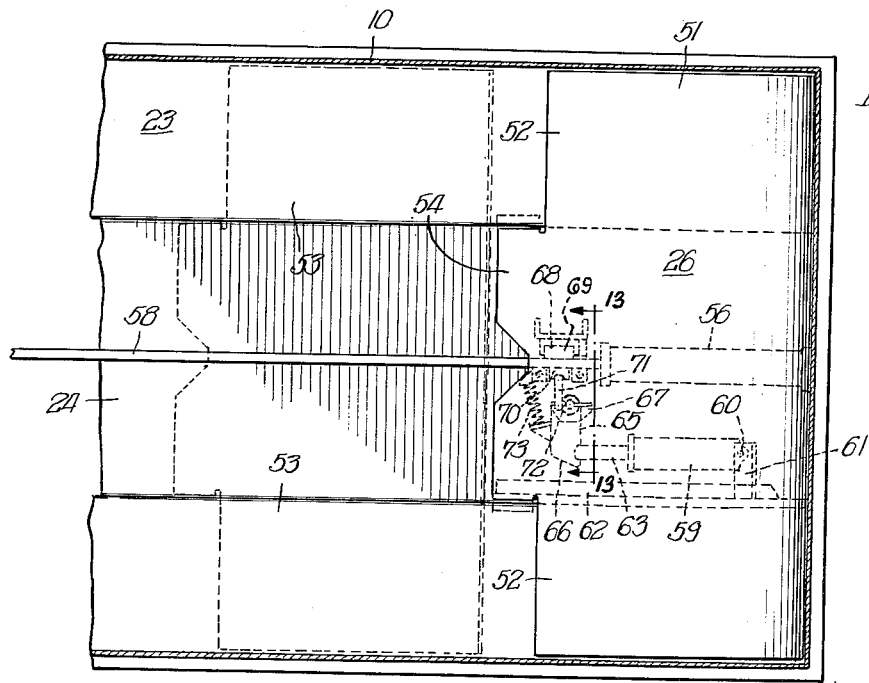
INVENTOR.
Cyril R. Gollnick,
BY
Grist, Lockwood, Greenawalt & Dewey
attys.

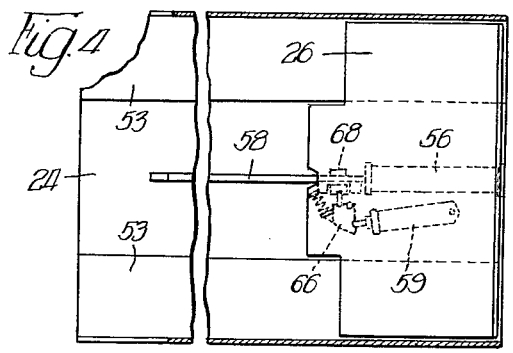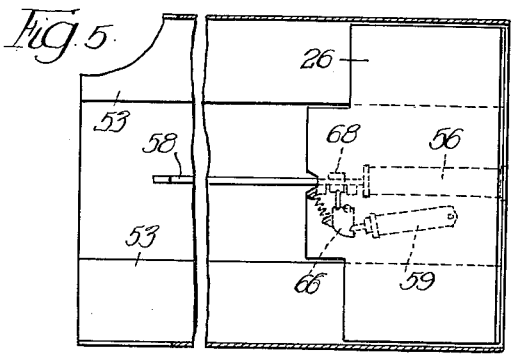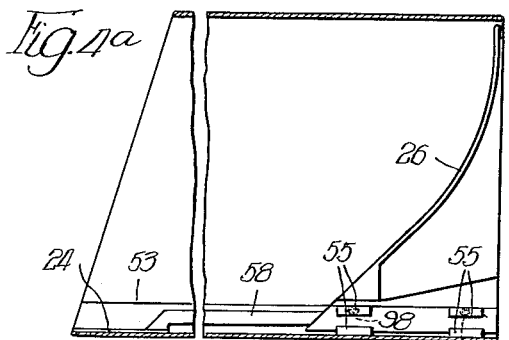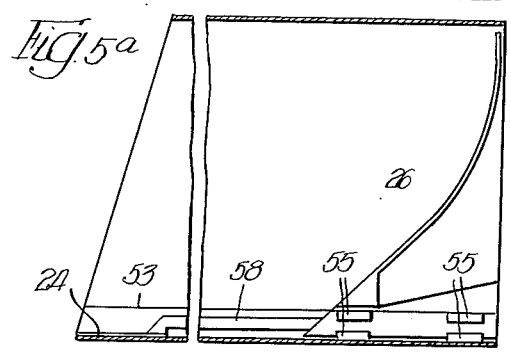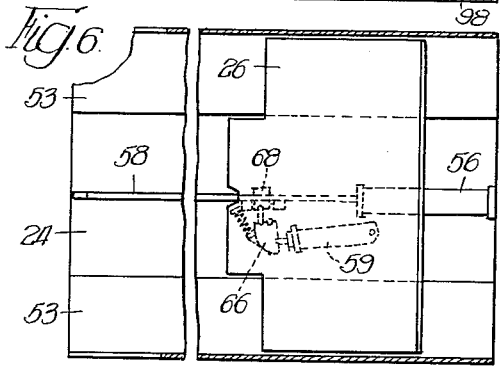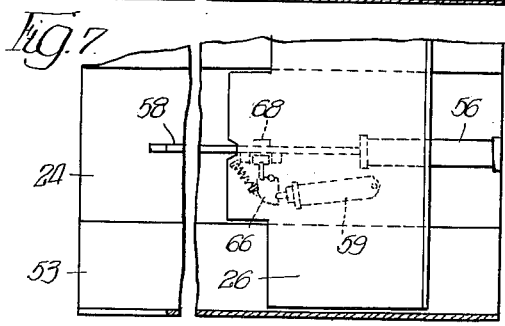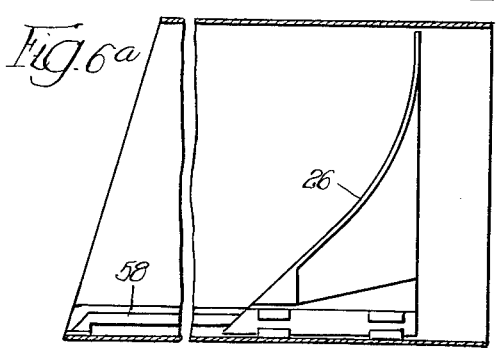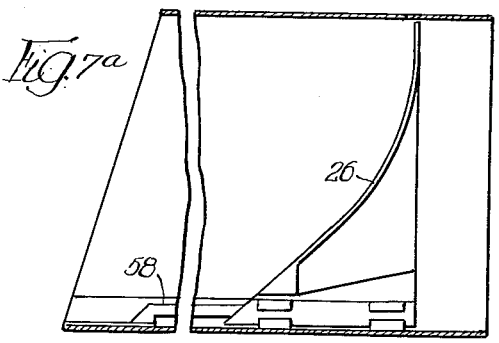

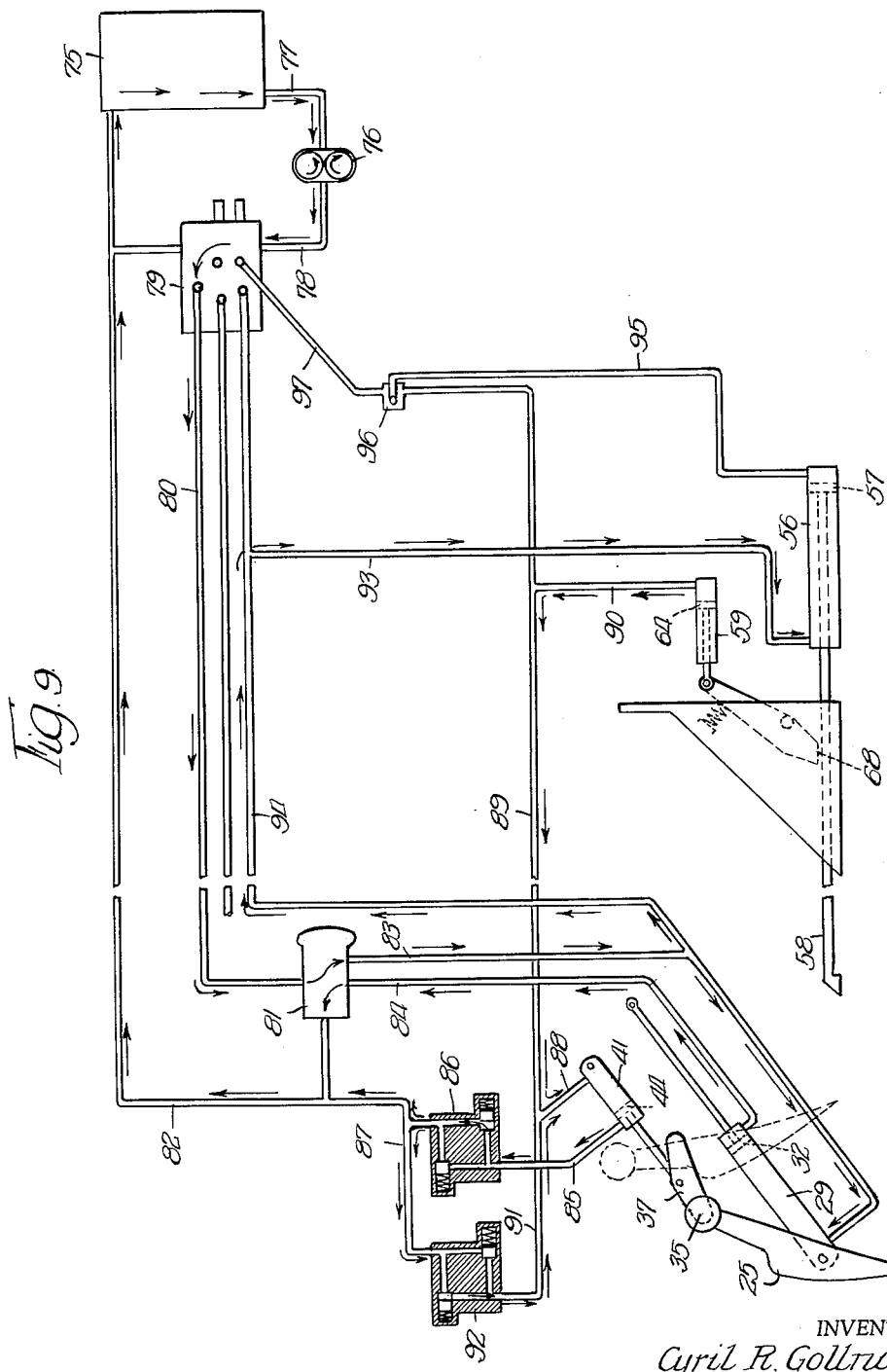

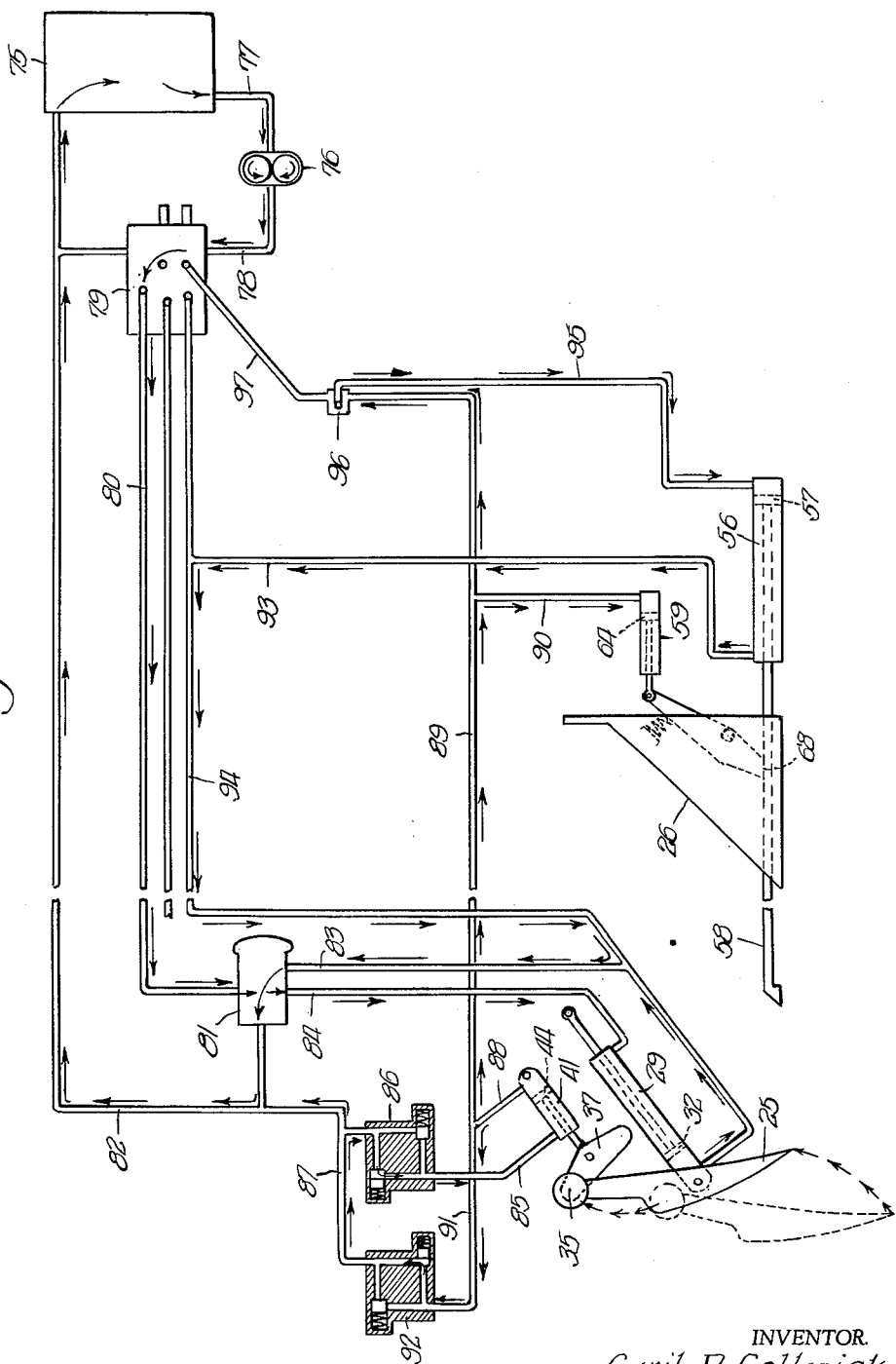

Nov. 30, 1965   C. R. GOLLNICK   3,220,586
REFUSE COLLECTING AND TRANSPORTING VEHICLE
Filed Aug. 26, 1963   8 Sheets-Sheet 6
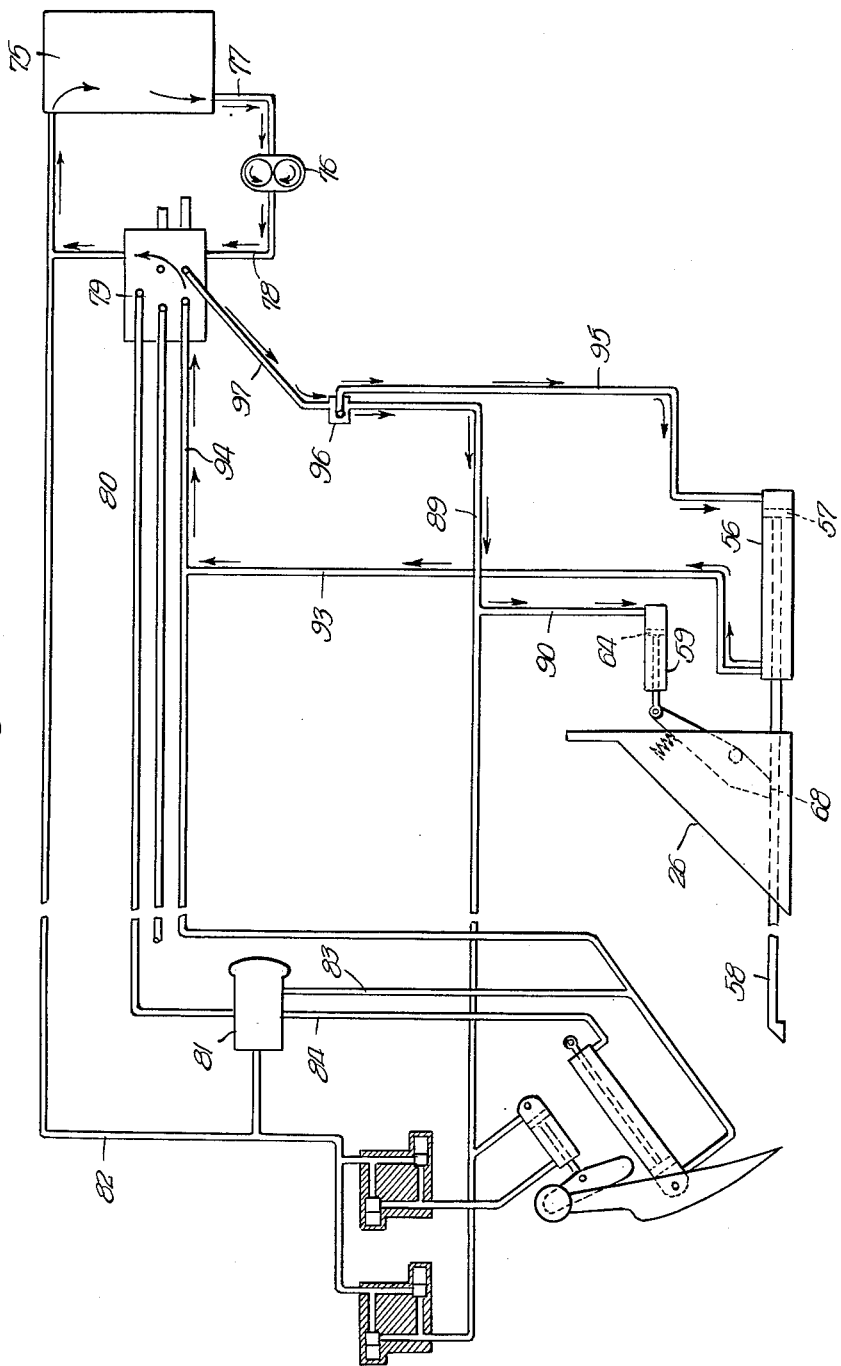
INVENTOR.
Cyril R. Gollnick,
BY
Strich, Lockwood, Greenawalt & Dewey.

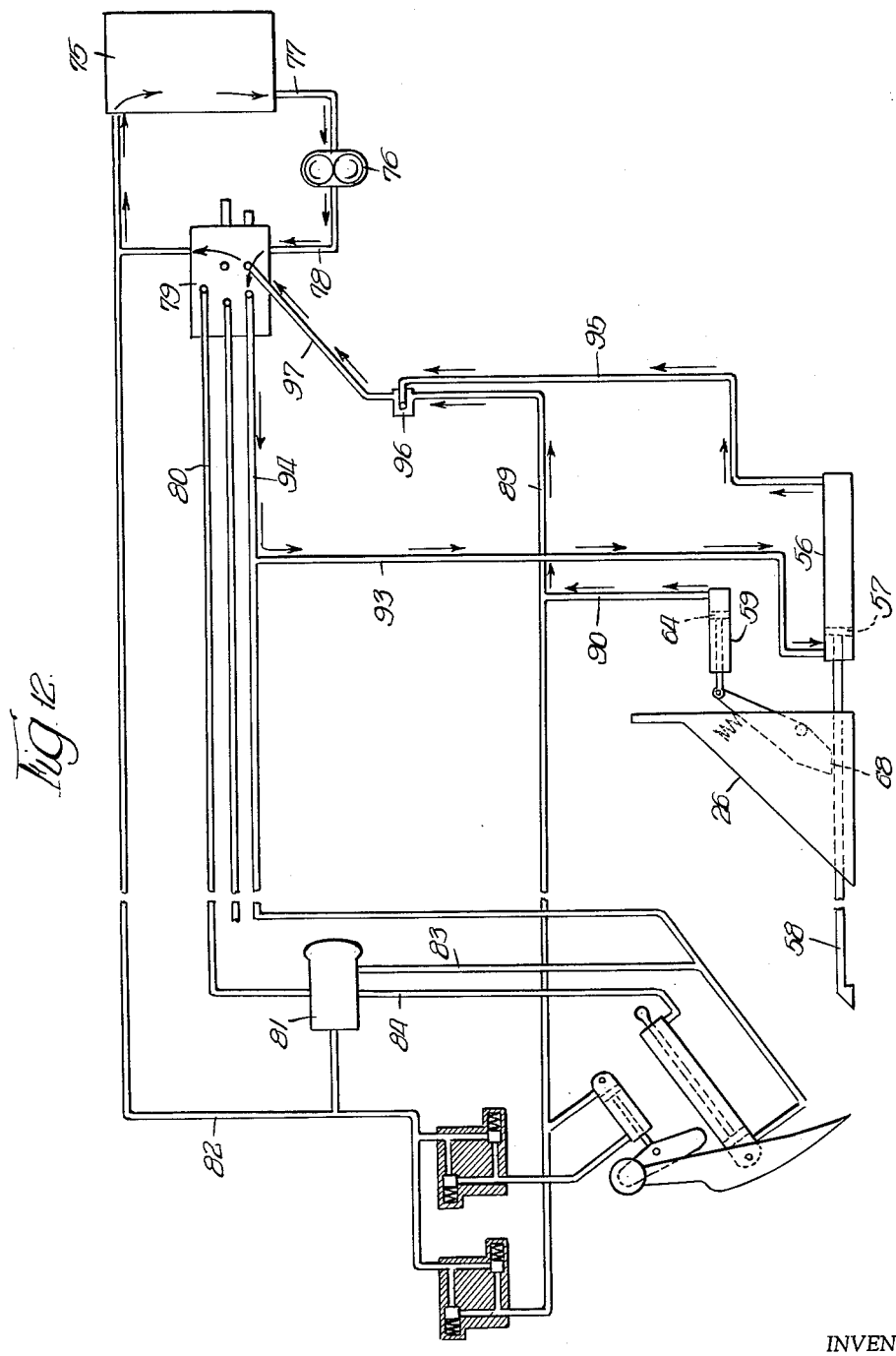

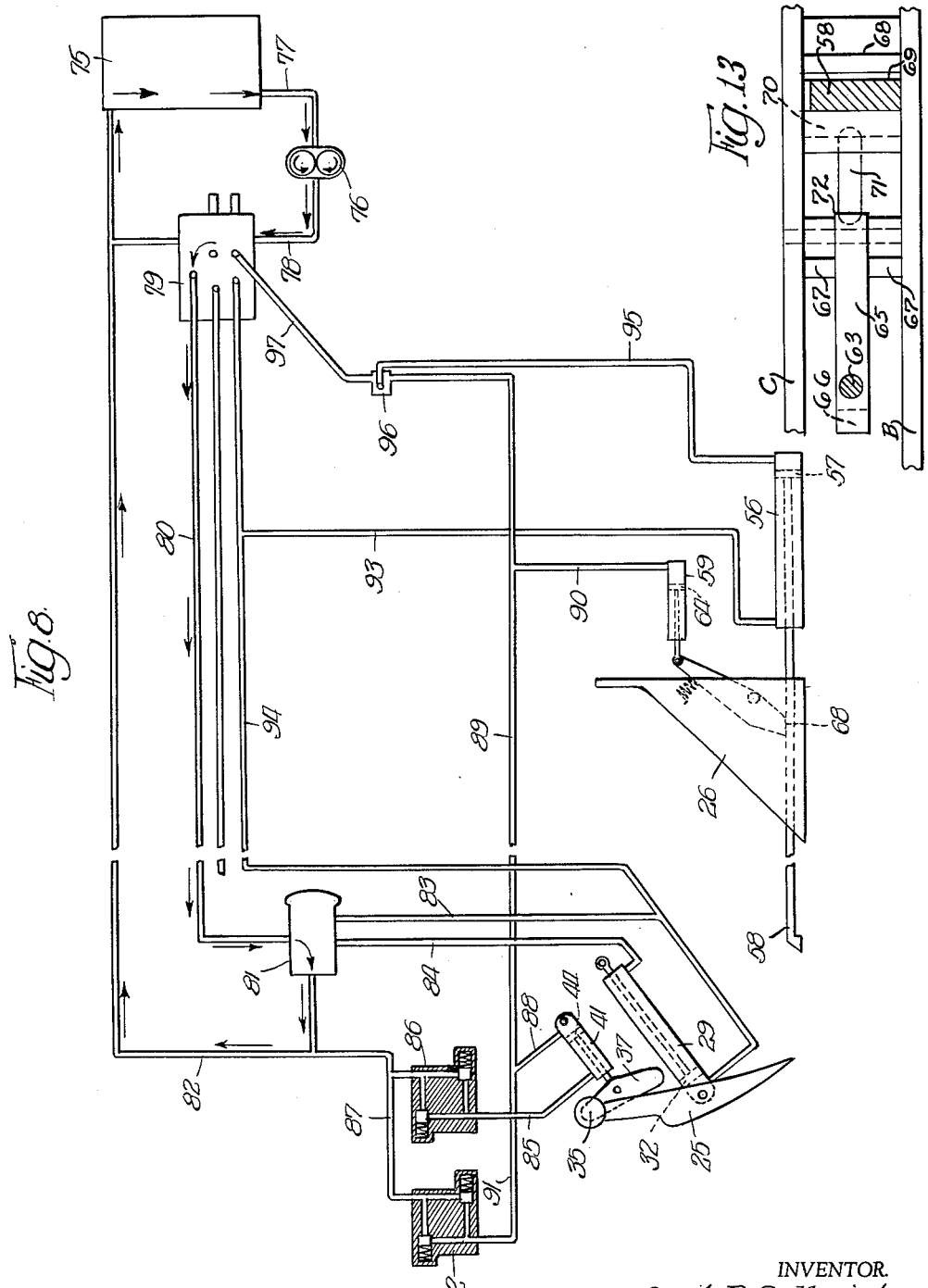

United States Patent Office 3,220,586
Patented Nov. 30, 1965

3,220,586
REFUSE COLLECTING AND TRANSPORTING
VEHICLE
Cyril R. Gollnick, Oshkosh, Wis., assignor to Leach Company, Oshkosh, Wis., a corporation of Wisconsin
Filed Aug. 26, 1963, Ser. No. 304,373
7 Claims. (Cl. 214—518)

This invention has to do with refuse collecting and transporting vehicles of the type in which means are provided for loading the refuse into the body of the vehicle and at the same time compacting the refuse within the body.

The invention resides in the provision of new and improved means for compacting the refuse to a very high degree through the instrumentality of a novelly controlled cross partition in the body, which cross partition is movable but is prevented from yielding forwardly while the refuse is being compacted against the same by the forward movement of a packer plate, tends to move rearwardly toward the packer plate during the forward movement of the latter to further compact the intervening refuse, and is momentarily released during the rearward movement of the packer plate in order to readjust its position within the body.

The invention also resides in the provision of new and improved means for moving the cross partition rearwardly to eject all of the compacted refuse from the body after the latter has been loaded.

While the foregoing statements are indicative in a general way of the nature of the invention other more specific objects and advantages will be evident to those skilled in the art upon a full understanding of the construction, arrangement and operation of the novelly operating refuse handling means.

A preferred embodiment of the invention is disclosed herein but it will of course be appreciated that the invention is susceptible of incorporation in other forms coming equally within the scope of the appended claims.

In the accompanying drawings:

FIG. 1 is a longitudinal vertical section through a refuse vehicle equipped with the improvements which constitute the invention—the section in the left-hand side of the view being taken through the tailgate housing and the packer plate on a vertical plane located adjacent the near side of the housing, and being taken in the right-hand side of the view through the body and the movable partition on a vertical plane located adjacent the center-line of the body;

FIG. 2 is a rear end view of the body and the movable partition, with the tailgate housing removed;

FIG. 3 is a horizontal section through the front portion of the body, showing the movable partition and the movable bar to which the partition is releasably clamped;

FIG. 4 is a view similar to FIG. 3 showing the clamp which secures the partition to the bar released;

FIG. 5 is similar to FIG. 4 but shows the clamp in its engaged position, in readiness to cause the partition to move rearwardly with the bar when the bar is moved rearwardly;

FIG. 6 is similar to FIG. 4 but shows the partition in one of its intermediate positions, with the clamp engaged;

FIG. 7 is similar to FIG. 6, but with the clamp released;

FIGS. 4a through 7a are vertical longitudinal sections which correspond respectively to FIGS. 4 through 7;

FIG. 8 illustrates schematically the flow pattern of a hydraulic circuit for use in operating and controlling both the packer plate and the movable partition, showing the flow pattern in its idling condition, with the packer plate held stationary in its normal load-retaining position, and with the movable partition also held stationary;

FIG. 9 is a similar view, following the initiation of the packer plate operating cycle, in which a second flow pattern has been established which causes the packer plate to first swing rearwardly above the hopper and then move downwardly into the rear part of the hopper, and which at the same time causes the clamp which holds the movable partition from moving forwardly to be acted upon to release the partition during the downward movement of the packer plate;

FIG. 10 is a similar view, showing a third flow pattern, in which the packer plate has been caused to move forwardly through the bottom of the hopper back into its forward load-retaining position and during such forward movement the movable partition has not only been held non-yieldably against forward movement but has been acted on to move rearwardly toward the then advancing packer plate;

FIG. 11 is another view of the hydraulic system, showing the manner in which a fourth flow pattern functions to move the partition rearwardly to start ejecting the load from the body by a step-by-step action after the tailgate housing and the packer plate have been swung upwardly and rearwardly into an out-of-the-way position;

FIG. 12 is a view similar to FIG. 11, showing the manner in which a fifth flow pattern functions to release the partition after it has been moved rearwardly a step and then re-engage the partition to move it rearwardly again another step; and FIG. 13 is a fragmentary elevational view taken generally along the lines 13—13 of FIG. 3.

As shown in FIG. 1, the refuse vehicle includes a large capacity storage body 10 of horizontally elongated generally rectangular cross section which is normally closed at its rear end 11 by a complementary upwardly and forwardly curved tailgate housing 12. The housing 12, which is somewhat narrower than the body 10, is pivotally connected at the upper edge of its front end 13 to the upper edge of the rear end 11 of the body at 14, whereby to permit the housing to be swung rearwardly and upwardly into an out-of-the-way position by means of hydraulic cylinders (not shown) when the refuse which has been compacted within the body is to be ejected rearwardly through the then open rear end 11 of the body. Suitable clamping means (not shown) are provided for securing the housing 12 in its lowered position.

The housing 12 is shaped to provide in the lower portion of the same an upwardly opening transversely elongated hopper 15 into which batches of loose refuse are adapted to be initially dumped through an opening 16 in the rear wall 17 of the housing. The opening 16 is adapted to be closed when not in use by an upwardly and downwardly movable door 18. The bottom 19 of the hopper 15 first slopes upwardly and forwardly at 20, and then extends forwardly for a short distance at 21 into registration with the rear end 22 of the bottom 23 of the body 10, at opposite sides of a centrally arranged longitudinally extending gutter 24 formed in the bottom 23.

In the upper portion of the housing 12 a movable packer plate, designated generally as 25, is located for the purpose of transferring from the hopper into the body refuse which has been dumped into the hopper through the opening 16. The packer plate 25 not only serves to transfer the refuse but at the same time acts to compact the refuse under great pressure against a cross partition 26 in the body. The partition 26 is sometimes referred to as the compaction plate because of the manner in which it coacts with the packer plate to compress the refuse and is also sometimes referred to as the push-out plate because of the manner in which it also functions, after the body has been loaded, to push the compacted refuse out of the rear end of the body. The partition 26 is shown in full lines in FIG. 1 in its most forwardly advanced position in the body, which is the position which it assumes after the body has been completely filled with the compacted refuse, and it is also shown fragmentarily in dotted lines in the same view in various intermediate positions.

The packer plate 25 is characterized by a transversely extending blade 27 which extends from one side of the housing 12 to the other and by a pair of upwardly projecting arms 28 which are located in inwardly spaced relation to the ends of the blade 27. The packer plate is caused to move forwardly and rearwardly in the housing 12 by a pair of hydraulic cylinders 29, which are sometimes referred to as the packer cylinders. The cylinders 29 are pivotally connected at 30 to the packer plate adjacent the ends of the blade 27, and the rods 31 of the pistons 32 within the cylinders 29 are pivotally connected at 33 to the sides 34 of the housing 12 near the top of the same.

The upwardly projecting arms 28 of the packer plate 25 are pivotally connected at 35 to the free ends 36 of a pair of links 37 through the intermediary of a torque tube 38, which tube is rigidly attached to the free ends 36 of the links and extends between the same. The other ends 39 of the links 37 are pivotally connected at 40 to the sides 33 of the housing. The movement of the links 36 is controlled by a hydraulic cylinder 41, which is sometimes referred to as the control cylinder or brake cylinder. The cylinder 41 is pivotally connected at 42 to one of the sides 33 of the housing, and the rod 43 of the piston 44 within the cylinder 41 is pivotally connected at 45 to one of the links 37 intermediate the ends of the same. The forward pivotal movement of the free upper ends of the links 37 is limited by engagement of the same with stops 46 secured to the sides of the housing.

The packer plate 25 is provided adjacent its ends with a pair of oppositely spring-pressed guide rollers 47, which rollers are adapted to spring outwardly into and remain in forwardly and upwardly inclined guide grooves 48 in the sides of the housing 12 at the beginning of and following the forward movement of the packer plate, whereby to cause the lower edge 49 of the blade 27 of the same to follow the bottom 19 of the hopper. At the elevated forward ends of the guide grooves 48 downwardly spring-biased angle plates 50 are pivotally attached to the sides of the housing. These angle plates are deflectable by the rollers 47 and drop back into positions to keep the rollers from reentering the grooves 48 after the rollers have left the grooves and the packer plate has started to move rearwardly again.

During the rearward movement of the packer plate 25 under the action of the hydraulic cylinders 29, the links 37 are held by the action of the hydraulic cylinder 41 in the position shown in FIG. 1, with the result that during such rearward movement the lower edge 49 of the blade of the packer plate will follow the elevated arcuate path indicated by the arrow *a* to a position adjacent the rear wall 17 of the hopper, passing over whatever refuse may have been dumped in the hopper.

When the packer plate 25 reaches the rear wall 17 of the housing 12, at the rear end of its rearward movement, it abruptly changes direction and moves downwardly, still under the pushing action exerted thereon by the hydraulic cylinders 29. During its downward movement the upper free ends 36 of the pivotally mounted links 37 will be caused by the downward pull thereon to move downwardly with the packer plate. In the downward movement of the packer plate the lower edge 49 of the blade 27 follows the generally vertical path indicated by the arrow *b*, into a position closely adjacent the rear end of the bottom 19 of the hopper, at which point the guide rollers 49 on the packer plate spring outwardly into the guide grooves 48 in the sides of the housing.

As soon as the blade 27 of the packer plate has reached downwardly into the rear end of the hopper behind the batch of refuse therein, the action of the hydraulic cylinders 29 is reversed automatically by suitable means (not shown), from a pushing action to a pulling action, after which the packer plate commences to move forwardly, with the lower edge 49 of the blade being caused to follow the bottom 19 of the hopper, along the path indicated generally by the arrow *c*.

As the blade 27 moves forwardly through the hopper under the hold-down action of the guide rollers 47 the links 37 which control the attitude of the packer plate, gradually swing back up again into the position shown in FIG. 1, and as the blade 27 approaches the end of its forward movement the free ends 36 of the links abut with stops 46, the guide rollers 47 ride out of the front ends of the grooves 48, and the blade 27 then continues forwardly for a short distance over the elevated forwardly extending portion 21 of the hopper about the then stationary pivot point 35, causing the blade to impart a final compacting thrust against the refuse in front of it.

The upper part of the front end 13 of the tailgate housing 12 is closed off by a cross wall 50 at a point immediately in front of the packer plate 25 and its associated operating mechanism. The wall 50 extends downwardly from the top of the housing and terminates in a rearwardly extending reenforced lower edge at a point adjacent the level of the upper edge of the blade 27. The wall 50, which does not interfere in any way with the pushing of the refuse forwardly into the lower part of the body by the packer plate, serves to keep the refuse from working back into the upper portion of the housing 12. The wall also provides an abutment against which the refuse, as it rises into the upper portion of the body because of its confinement between the packer plate and the partition, will be further and more solidly compacted by the action of the partition 26.

The movement of the packer plate 25 as herein described is similar in a general way to the movement of the packer plate disclosed in applicant's earlier Patent No. 2,649,216.

The movable partition 26 is disposed in an upright position crosswise of the body 10, extending laterally from side to side and vertically from top to bottom. The partition 26 is of generally triangular form in side elevation and its rear refuse-engaging face 51 is inclined downwardly and rearwardly at a substantial angle. The lower edge 52 of the rear face of the partition conforms generally to the spaced side sections 53 of the bottom 23 of the housing at opposite sides of the gutter 24 in the bottom, and is provided at the location of the gutter with a downwardly extending portion 54 which fits within and closes off the gutter.

The partition 26 is movable from one end of the body to the other and during its movement is supported on and guided by anti-friction blocks 55, which blocks are attached to the lower portion of the partition and slidably engage top and bottom with longitudinally extending structural portions of the body beneath the side sections 53 of the bottom, outwardly of the gutter 24.

The movement of the packer plate 26 in the body is controlled by a hydraulic cylinder 56, which cylinder is mounted in the front end of the body in line with the gutter 24 in the bottom of the body. This hydraulic cylinder, which is sometimes referred to as the push-out cylinder, has its piston 57 connected with a long longitudinally extending thrust bar 58, which bar is sometimes referred to as the holding bar or push-out bar. The bar 58, which moves with the piston 57, extends rearwardly from the cylinder 56 along the bottom of the body within the gutter 24 and is slidably supported and held against sidewise movement in the gutter by suitable guide means (not shown).

The partition 26 carries a hydraulic cylinder 59, which is sometimes referred to as the clamping cylinder. The cylinder 59, which is shown in FIG. 3, is pivotally connected at 60 to a bracket 61 on a portion 62 of the understructure of the partition 26, for movement longitudinally of the body 10 with the partition. As best seen in FIGS. 3 and 13, the rod 63 of the piston 64 within the cylinder 59 extends rearwardly from the cylinder for a short distance and acts against one face 65 of a bell-crank lever 66, which lever is pivotally mounted on a bracket 67 on the understructure of the partition 26 between flat plate-like brace members B and C which rigidify the partition 26 between the side sections 53.

A releasable clamp 68 is also mounted on the understructure of the partition, in embracing relation to the bar 58, and consists of a stationary clamping block 69 at one side of the bar and a movable clamping block 70 at the other side of the bar in closely adjacent relation to the bell-crank lever 66.

The movable clamping block 70 of the clamp 68 is moved by the action of the cylinder 59 into clamping engagement with the bar 58 through the intermediary of a short thrust rod 71, which rod is seated at one of its ends in a socket in the movable clamping block 70 and is seated at its opposite end in a socket in the other face 72 of the bell-crank lever 66. When the clamping pressure exerted on the bar 58 by the action of the cylinder 59 is discontinued the bell-crank lever 66 is swung back by the action of a spring 73, thereby releasing the bar 58 and disconnecting the partition 26 from the bar.

In order to limit the rearward movement of the partition 26 the bar 58 is provided at its rear end with a hook formation 74, which formation will engage with a complementary portion (not shown) of the partition when the partition, in being moved rearwardly during the ejection of the load as hereinafter described, reaches the rear open end of the body.

In compacting the refuse which is loaded into the body 10 the packer plate 25 and the movable partition 26 coact automatically with each other on the intervening refuse in a novel and highly effective pincer-like operation.

When the body 10 is empty and ready to be loaded the partition 26 will be initially located in the body adjacent the rear end 11 of the latter and will be prevented by the clamping action of the cylinder 59 on the bar 58 from being moved forwardly in the body.

As the packer plate 25 moves forwardly and forces the refuse from the hopper 15 into the body 10 against the partition 26 the refuse will be compacted between the confronting faces of the packer plate and the partition, and the partition (unless it already is as far to the rear as it can go) will at the same time automatically move rearwardly toward the forwardly advancing packer plate whereby to further augment the compacting action. In all positions of the partition 26 (except its rearmost position) the partition will tend to move rearwardly toward the packer plate while the latter is moving forwardly. The downward and rearward slope of the rear face 51 of the partition 26 will at the same time act to elevate the compacted refuse and further compact the same between the rear face 51 of the upper portion of the partition 26 and the cross wall 50 at the upper portion of the front end of the tailgate housing.

As soon as the packer plate commences to move rearwardly in the tailgate housing from its forwardly advanced load-retaining position, in order to engage behind another batch of refuse in the hopper, the partition 26 will be released from the bar 58 by the action of the spring 73 and will be free to edge forwardly a little in the body 10 to adjust itself to the pressure of the load confined behind the same. This release is of but short duration and takes place only during the time that is required for the packer plate to move downwardly into the rear end of the hopper to engage behind the next batch of refuse.

As soon as the packer plate 25 starts its forward movement again the partition 26 will not only be clamped to the bar 58 but the bar 58 will at the same time be moved rearwardly and move the partition rearwardly with it. During the forward or packing movement of the packer plate 25 the partition 26 is prevented from yielding forwardly regardless of the amount of pressure exerted thereon by the action of the packer plate on the intervening refuse.

The above described operation may be accomplished by a hydraulic system of the character schematically illustrated in FIGS. 8 to 12, inclusive.

As will be observed in FIG. 8, the system includes a reservoir 75 for the oil, a pump 76 which takes the oil from the reservoir through a line 77 and delivers it under pressure through a line 78 to a directional valve 79, a line 80 from the directional valve 79 which delivers oil to a control valve 81, and a line 82 from the control valve which returns oil back to the reservoir 75.

This is the flow pattern of the oil in the idling condition of the packing mechanism, in which condition the packer plate 25 is held stationary in its normal forwardly advanced load-retaining position, the bar 58 is held stationary in its forwardly retracted position, and the partition 26 is clamped to the then stationary bar 58.

To set the packing mechanism in operation a second flow pattern, shown in FIG. 9, is established. The control valve 81 is shifted manually to direct the oil from the line 80 into a line 83 which is connected with the piston-ends of the packer cylinders 29, while the oil in the piston-rod ends of the packed cylinders 29 is at the same time expelled from those ends through a line 83 which is connected through the control valve 81 with the return line 82.

The resulting extension of the packer cylinders 29, as shown in FIG. 9, swings the then elevated packer plate 25 rearwardly about its then stationary pivot point 35 on the links 37, and when the lower edge 49 of the blade 27 of the packer plate reaches the rear wall 17 of the housing 12 the continued extension of the cylinders 29 forces the packer plate to move downwardly behind the load in the hopper into the lowered position shown in full lines in FIG. 9, with a corresponding extension of the brake cylinder 41 which results from the downward pull of the packer plate on the links 37.

After the packer plate 25 has swung rearwardly and while it is moving downwardly the extension of the brake cylinder 41 caused by the movement of the links 37 in being pulled downwardly forces the oil in the piston-rod end of the brake cylinder 41 to be expelled through a line 85 past a restricting valve 86 into a line 87, which line in turn communicates with the return line 82. At the same time the extension of the brake cylinder 41 draws make-up oil into the piston-end of the brake cylinder 41 through a line 88, all as indicated in FIG. 9. The line 88 is connected in one driection with a line 89 which communicates with a line 90 connected with the piston-end of the clamping cylinder 59, which cylinder is a single-acting cylinder, while the line 88 is connected in the other direction with a line 91, which communicates with the line 87 through another restricting valve 92.

As a result of this arrangement the clamp 68 will be released by the evacuation of the clamping cylinder 59 to disconnect the partition 26 from the bar 58 during the filling of the piston-end of the brake cylinder 41 caused by the downward movement of the links 37. Any oil required by the extension of the brake cylinder 41, in excess of that which is available from the clamping cylinder 59, is obtained by the cylinder from the line 91 through the restricting valve 92.

During this period the bar 58 which controls the partition 26 will be maintained in its forwardly shifted position by the pressure of the oil in the piston-rod end of the cylinder 56 through a line 93 which communicates with a line 94 connected with the line 83. The piston-end of the cylinder 56 is connected with a line 95, which line communicates with a sequence valve 96 which is in turn connected with a line 97 leading to the directional valve 79. The line 89 also connects with the line 97 through the sequence valve 96.

From the foregoing it will be understood that during the downward movement of the packer plate 25 the partition 26 will be automatically released from the bar 58, thereby permitting the partition to adjust itself to the pressure of the highly compacted mass of refuse behind it in the body 10 and enable additional refuse to be introduced by the packer plate 25 for compacting.

As soon as the packer plate 25 reaches the bottom of the hopper 15 in preparing to engage with and move another batch of refuse itno the body the control valve 81 is shifted automatically by suitable means (not shown) to establish a third flow pattern, which pattern is illustrated schematically in FIG. 10.

Oil is now caused to flow from the line 80 through the control valve 81 and through the line 84 into the piston-rod ends of the cylinders 29, which flow moves the packer plate 25 from the dotted line position shown in FIG. 10 into the full line position shown in that view. During this movement the oil in the piston-ends of the cylinders 29 is expelled through the line 83 back through the control valve 81 into the return line 82. While this action is taking place the links 37 will be forced upwardly by the forward and upward movement of the packer plate 25, with the result that the oil in the piston-end of the cylinder 41 will be expelled through the lines 88, 89 and 90 and delivered into the piston-end of the clamping cylinder 59, causing the clamp 68 to clamp the partition 26 to the bar 58. At the same time a portion of the oil expelled from the cylinder 41 will continue in the line 89 past the line 90 into the sequence valve 96 and will be directed by that valve into the line 95 leading into the piston-end of the cylinder 56, thereby applying pressure on the bar 58 to move the same rearwardly with the partition 26 toward the apporaching packer plate 25. Any oil expelled from the cylinder 41 in excess of that required to operate the cylinders 59 and 56 will pass through the line 91 and through the restricting valve 92 back into the line 87. The make-up oil required at this time for the piston-rod end of the cylinder 41 will be drawn from the line 87 through the line 85 by way of the restricting valve 86.

After the body 10 has been completely filled with the compacted refuse and is ready for emptying, the flow patterns shown in FIGS. 11 and 12 are alternately brought into operation. Before starting to empty the body the packer plate 25 and its associated operating mechanism, together with the tailgate housing 12, is moved rearwardly and upwardly into an out-of-the-way position.

The load is ejected through the then open rear end 11 of the body by a step-by-step movement of the partition 26, controlled by manually operating the directional valve 79, first in one direction and then in the other. When the valve 79 is moved in one direction the flow illustrated in FIG. 11 will be established. This consists in forcing oil from the line 78 into the line 97 and discharging such oil through the sequence valve 96 first into the piston-end of the cylinder 59 through the lines 89 and 90 and then through the line 95 into the piston-end of the cylinder 56. As a result of this, the partition 26 is first clamped to the bar 58 and the bar 58 is then moved rearwardly with the partition for the length of the stroke of the piston 57 in the cylinder 56, causing the partition to move the load rearwardly a corresponding distance. During this movement the oil in the piston-rod end of the cylinder 56 will be expelled through the lines 93 and 94 back into the return line 82 by way of the directional valve 79. As soon as the bar 58 has reached the rear end of its movement directional valve 79 is manually reversed, causing the flow of the oil to follow the pattern shown in FIG. 12. In this changed position of the directional valve 79 oil will flow through the line 94 into the line 93 and from there into the piston-rod end of the cylinder 56, causing the bar 58 to be returned again to its forwardly advanced position, in readiness for another ejecting stroke. As the bar 58 is being returned the oil in the piston-end of the cylinder 56 will be expelled through the line 95 into the line 97 by way of the sequence valve 96. At the same time the oil in the piston-end of the cylinder 59 will be expelled by the action of the spring 73 to release the clamp 68 and will flow through the line 90 into the line 89 and from there through the sequence valve 96 back into the line 97. The establishment of this flow will release the partition 26 and permit it to remain stationary while allowing the bar 58 to return into its forwardly advanced position in readiness for the next ejecting movement of the partition, which is a repetition of the movement referred to in connection with FIG. 11. The directional valve is operated alternately to establish the flow patterns illustrated in FIGS. 11 and 12, resulting in a step-by-step rearward ejecting movement of the partition 26, and this operation is continued by manual manipulation of the valve 79 until the entire load has been discharged from the open rear end 11 of the body.

When the vehicle is travelling from one place to another any sudden starting or stopping might tend to cause the partition 26 to shift its position in the body 10, since during that time the hydraulic system would normally be shut down and no clamping pressure would be exerted on the partition 26. To prevent any such inadvertent shifting, the partition 26 may be held stationary or substantially so by providing spring-pressed means 98 behind one or more of the blocks 55 for pressing the blocks outwardly into frictional holding engagement with opposed portions of the body.

I claim:

1. In a refuse collecting and transporting vehicle, a body in which refuse is adapted to be compacted, a tailgate housing having a hopper for the reception of a batch of refuse, transfer means in the housing, which transfer means is advanceable to transfer into the rear end of the body a batch of refuse which has been deposited in the hopper, and which is retractable into a position to transfer another batch of refuse, means for advancing and retracting said transfer means, a partition which is movable forwardly and rearwardly in the body in front of said transfer means, means conditioned by the position of said transfer means for preventing the partition from being moved forwardly while said transfer means is being advanced, and means conditioned by the position of said tansfer means automatically moving the partition forwardly after said transfer means has started to retract and before it has started to advance.

2. In a refuse collecting and transporting vehicle, a body in which refuse is adapted to be compacted, a tailgate housing having a hopper for the reception of a batch of refuse, which hopper opens into the rear end of the body, a packer plate in the housing which is movable forwardly through the hopper to transfer a batch of refuse from the hopper into the rear end of the body, and which is movable first rearwardly above the hopper and then downwardly into the hopper to engage behind the next batch of refuse, means for moving the packer plate rearwardly, downwardly and forwardly, a partition which is movable forwardly and rearwardlly in the body in front of the packer plate, and means conditioned by the position of said packer plate for moving the partition rearwardly toward the packer plate while the packer plate is moving forwardly and moving said partition forwardly after said packer plate has started to move rearwardly.

3. In a refuse collecting and transporting vehicle, a body in which refuse is adapted to be compacted, a tailgate housing having a hopper for the reception of a batch of refuse, which hopper opens into the rear end of the body, a packer plate in the housing which is movable forwardly through the hopper to transfer a batch of refuse from the hopper into the rear end of the body, and which is movable first rearwardly above the hopper and then downwardly into the hopper to engage behind the next batch of refuse, means for moving the packer plate rearwardly, downwardly and forwardly, a partition which is movable forwardly and rearwardly in the body in front of the packer plate, means conditioned by the position of said packer plate for moving partition rearwardly toward the packer plate while the packer plate is moving forwardly, and means conditioned by the position of said packer plate automatically moving the partition forwardly while the packer plate is moving downwardly.

4. In a refuse collecting and transporting vehicle, a body in which refuse is adapted to be compacted, means for packing refuse into the body through the rear end of the latter, a movable partition in the body against which the refuse is packed, means for moving the partition rearwardly step-by-step to eject all of the refuse through the rear end of the body after the latter has been filled, said ejecting means including a hydraulic cylinder which is mounted in the front end of the body and is provided with a piston, means for moving the piston rearwardly and forwardly in the cylinder, an elongated bar in the body which is connected at its front end to the piston and is movable rearwardly and forwardly with the piston, clamp means connecting the partition to the bar to cause the partition to be moved rearwardly with the bar each time said bar is moved rearwardly a distance corresponding to the stroke of said piston, and control means to release the clamp means thereby releasing the same from the bar to permit the partition to remain stationary in the body each time that the bar is moved forwardly by said control means as it reverses the direction of said piston, said clamp means being simultaneously actuated into clamping relation with said bar and simultaneously released on change of direction of said piston through operation of said control means.

5. In a refuse collecting and transporting vehicle, a body in which refuse is adapted to be compacted, means for packing refuse into the body through the rear end of the latter, a movable partition in the body against which the refuse is packed, means for moving the partition rearwardly step-by-step to eject all of the refuse through the rear end of the body after the latter has been filled, said ejecting means including a hydraulic cylinder which is mounted in the front end of the body and is provided with a piston, means for moving the piston rearwardly and forwardly in the cylinder, an elongated bar in the body which is connected at its front end to the piston and is movable rearwardly and forwardly with the piston, which bar extends for substantially the full length of the body and terminates adjacent the rear end of the latter, a clamp carried by the partition in embracing relation to the sides of the bar for frictionally engaging the bar to connect the partition to the bar to cause the partition to be moved rearwardly with the bar each time that the bar is moved rearwardly a distance corresponding to the stroke of the piston, and means for releasing the clamp to disengage the partition from the bar to permit the partition to remain stationary in the body each time that the bar is moved forwardly again by the piston.

6. In a refuse collecting and transporting vehicle, a body in which refuse is adapted to be compacted, a tailgate housing having a hopper for the reception of a batch of refuse, transfer means in the housing, which transfer means is advanceable to transfer into the rear end of the body a batch of refuse which has been deposited in the hopper, and which is retractable into a position to transfer another batch of refuse, means for advancing and retracting said transfer means, a partition which is movable forwardly and rearwardly in the body in front of said transfer means, said partition co-operating with said transfer means for high density compaction of refuse, means to control the placement of said partition during the compaction of refuse, said last named means being operated by the condition of said means advancing said transfer means to prevent said partition from movement as said transfer means begins to advance and then moving said partition towards said transfer means simultaneously with the continued advancement thereof thereby to compact refuse therebetween.

7. The refuse and collecting and transporting vehicle of claim 6 wherein said means to control the placement of said partition during compaction of refuse includes means to move said partition forwardly after said transfer means has started to retract and before it has started to advance.

References Cited by the Examiner
UNITED STATES PATENTS

| 2,649,216 | 8/1953 | Gollnick | 214—83.3 |
| 2,803,357 | 8/1957 | Ronfeldt | 214—82 |
| 3,049,256 | 8/1962 | Urban | 214—82 X |

HUGO O. SCHULZ, *Primary Examiner.*